(12) United States Patent
Wagner et al.

(10) Patent No.: US 10,455,493 B2
(45) Date of Patent: Oct. 22, 2019

(54) MODIFIABLE NETWORK OPERATIONS IN A STREETLIGHT CONTROL NODE

(71) Applicant: ABL IP Holding LLC, Atlanta, GA (US)

(72) Inventors: Phillip Ryan Wagner, Baltimore, OH (US); Justin Charles Wilson, Westerville, OH (US); Robert Burt, Columbus, OH (US); Shawn L. Pleasants, Granville, OH (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/021,180

(22) Filed: Jun. 28, 2018

(65) Prior Publication Data

US 2019/0007898 A1    Jan. 3, 2019

Related U.S. Application Data

(60) Provisional application No. 62/527,443, filed on Jun. 30, 2017.

(51) Int. Cl.
*H05B 37/02* (2006.01)
*H04L 12/24* (2006.01)
(Continued)

(52) U.S. Cl.
CPC ......... *H04W 48/18* (2013.01); *H04L 41/0816* (2013.01); *H05B 37/0272* (2013.01);
(Continued)

(58) Field of Classification Search
CPC ..... H04W 48/18; H04W 88/06; H04W 84/18; H05B 37/0272; H04L 41/0816
See application file for complete search history.

(56) References Cited

U.S. PATENT DOCUMENTS 10,262,527 B2 * 4/2019 Benien ............... H05B 37/0272
2007/0085701 A1 * 4/2007 Walters ................. G06Q 30/04
340/870.02

(Continued)

*Primary Examiner* — Christopher M Brandt
(74) *Attorney, Agent, or Firm* — Kilpatrick Townsend & Stockton LLP

(57) ABSTRACT

An intelligent streetlight may include a modem capable of communicating on a mobile communications network. The intelligent streetlight may be communicate with a network operations center ("NOC") via the mobile communications network. In some aspects, the intelligent streetlight configures the modem to transmit on the mobile network based on multiple types of network provisioning data. For example, the modem may have a network configuration, such as a low-bandwidth mobile data plan, based on stored provisioning data. The modem may reconfigure the modem based on additional provisioning data for an additional network configuration, such as a high-bandwidth mobile data plan. In some cases, the additional provisioning data is requested by the streetlight from the NOC. In some cases, the NOC may provide the additional provisioning data to multiple intelligent streetlights, such that the multiple streetlights are each reconfigured in a short period of time.

16 Claims, 5 Drawing Sheets

(51) Int. Cl.
*H04W 84/18* (2009.01)
*H04W 48/18* (2009.01)
*H04W 88/06* (2009.01)
*H04W 24/02* (2009.01)

(52) U.S. Cl.
CPC ............ *H04W 24/02* (2013.01); *H04W 84/18* (2013.01); *H04W 88/06* (2013.01)

(56) References Cited

U.S. PATENT DOCUMENTS

| | | | |
|---|---|---|---|
| 2010/0278086 A1* | 11/2010 | Pochiraju | H04W 28/20 370/310 |
| 2014/0035482 A1* | 2/2014 | Rains, Jr. | H05B 37/0254 315/294 |
| 2014/0125250 A1* | 5/2014 | Wilbur | H01Q 1/2291 315/297 |
| 2014/0308943 A1* | 10/2014 | Parron | H04L 65/1016 455/418 |
| 2015/0346320 A1* | 12/2015 | Hartman | H05B 37/0227 315/312 |
| 2017/0094589 A1* | 3/2017 | Bhasin | H04W 48/16 |
| 2018/0287869 A1* | 10/2018 | Munafo | H04L 41/0816 |

* cited by examiner

MODIFIABLE NETWORK OPERATIONS IN A STREETLIGHT CONTROL NODE

RELATED APPLICATIONS

The present application claims priority to U.S. provisional application No. 62/527,443 for "4G Cell Modem in Streetlight Control Node" filed Jun. 30, 2017, which is incorporated by reference herein in its entirety.

TECHNICAL FIELD

This disclosure relates generally to the field of streetlight control, and more specifically relates to control of one or more streetlights via a mobile network modem.

BACKGROUND

Intelligent streetlight networks are often controlled remotely. For example, a streetlight network may be controlled by a municipality street maintenance office or police department. Such streetlight networks offer benefits such as higher efficiency, feedback regarding maintenance, and programming flexibility (e.g., programming to turn on or off at certain times). In addition, some streetlights on a network include (or can be connected to) sensors, such as security cameras, traffic sensors, gunshot sensors, or other sensor types. Additional data from such sensors is transmitted via the streetlight network to one or more operators (e.g., the municipality). Control of the network and transmission of data is accomplished via a communication link between the streetlight network and the operator.

Techniques for communicating with streetlight networks may include establishing and maintaining a network, such as a computer network linking the streetlights to a computer system of the operator. In some existing systems, such a computer network may include a local wireless network of nodes in a mesh or star configuration, where each streetlight in the network is associated with a node. The local wireless network may be connected to a gateway device, such as a router or network gateway, that provides a connection to a network operations center of the operator.

SUMMARY

Some aspects involve using a modem to control some operations of an intelligent streetlight. In an example, a modem in an intelligent streetlight is configured, based on first mobile network provisioning data, to communicate on a mobile communications network. The configured modem transmits a first communication on the mobile communications network. The streetlight receives, from a network operations center ("NOC"), a transmission describing second mobile network provisioning data. Based on the second mobile network provisioning data, the modem is reconfigured to communicate on the mobile communications network. The reconfigured modem transmits a second communication on the mobile communications network. In some cases, the intelligent streetlight provides to the NOC an indication that a high-bandwidth data type is available. Responsive to receiving the indication, the NOC transmits the transmission describing the second mobile network provisioning data.

In some implementations, the NOC provides to the intelligent streetlight first provisioning data indicating a low-bandwidth data type. Responsive to receiving an indication that a high-bandwidth data type is available, the NOC provides to the intelligent streetlight second provisioning data indicating a high-bandwidth mobile network configuration. In addition, the NOC receives the indicated high-bandwidth data type via the high-bandwidth mobile network configuration.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features of the present disclosure are better understood when the following Detailed Description is read with reference to the accompanying drawings.

DETAILED DESCRIPTION

Figure 1:
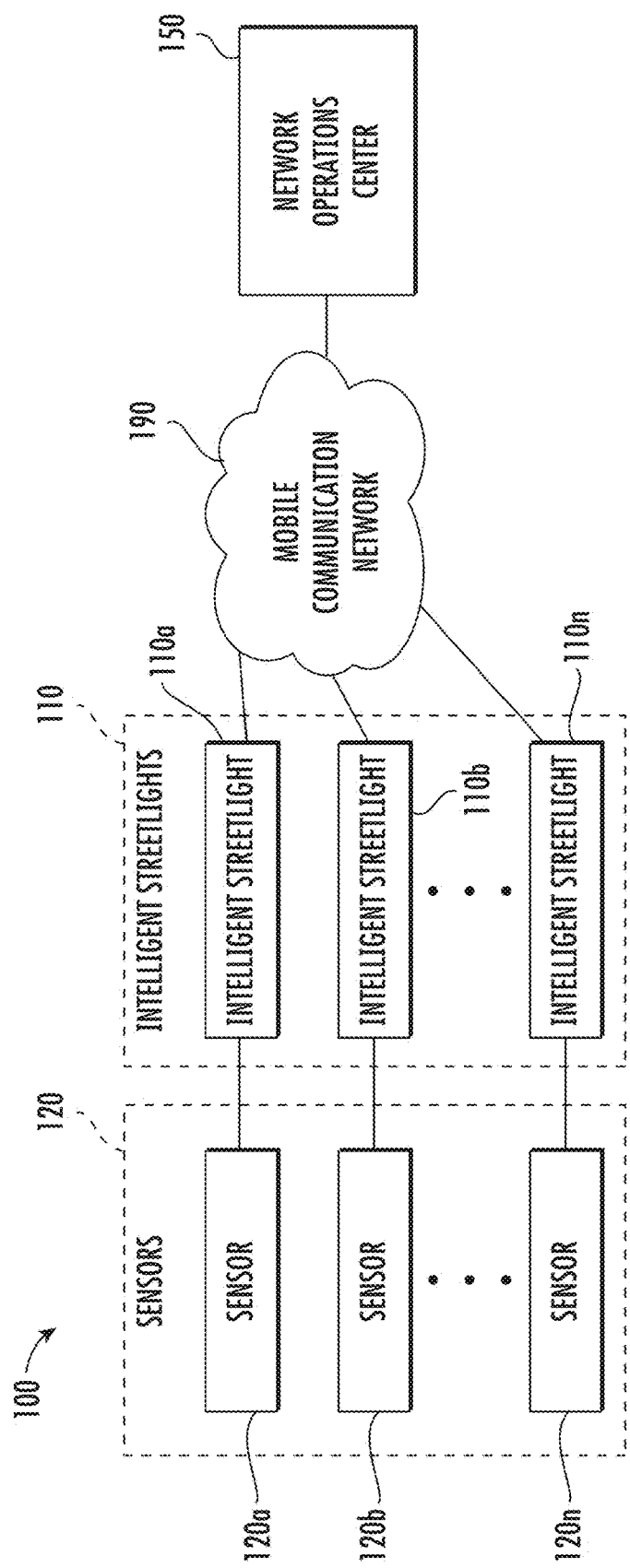
FIG. 1 depicts an example of a system enabling communication between intelligent streetlights and a network operations center, according to certain aspects.

In some implementations, certain aspects described herein provide for an intelligent streetlight that includes a modem that is capable of connecting to a mobile communication network. The intelligent streetlight connects to a mobile communication network via the modem. Additionally or alternatively, the intelligent streetlight modifies its own connection to the mobile communication network by, for example, requesting a type of connection (e.g., a data plan), a particular network within the mobile communication network (e.g., a network segment or proxy), or a different mobile communication network (e.g., re-provisioning). Intelligent streetlights that are capable of communicating via a mobile communication network may reduce or eliminate installation and maintenance of a local wireless network in the area of the streetlights. In addition, such an intelligent streetlight that communicates via a mobile network may modify its connection to the network, such as modifying a bandwidth or modifying the network in which the intelligent streetlight is included.

In some aspects, an intelligent streetlight network that is capable of communicating on a mobile communication network may reduce costs and effort related to installation and maintenance of a local wireless network. In addition, communicating via a mobile communication network may reduce a possibility of network failures, such as a failed node or gateway device. In some aspects, communicating on a mobile communication network may reduce a likelihood of interruptions in communications of the intelligent streetlights. In addition, a mobile communication network may be more resistant to tampering, such as by being more difficult to interrupt or misrepresent communications that are transmitted via the mobile network.

In some aspects, different types of streetlight networks may utilize different types of communications. For example, a streetlight network that includes sensors capable of producing large quantities of data (e.g., cameras which produce video data) requires a high-bandwidth data network. By contrast, a streetlight network that does not include sensors, or that includes sensors capable of producing small quantities of data, requires a low-bandwidth data network. In some aspects, modifications to the streetlight network (e.g., installation of higher-bandwidth sensor types) could overload a low-bandwidth network, resulting in unreliable communication (e.g., dropped packets, slow transmission of data). In some aspects, an intelligent streetlight communicating via a mobile communication network may avoid or reduce overload, such as by modifying a connection to the network. For example, an intelligent streetlight that communicates via a mobile communication network may modify a bandwidth of its connection (e.g., requesting a higher-bandwidth data plan), request a connection to a different network (e.g., a network with less traffic), or make other modifications to avoid unreliable communications.

As used herein, the term "operator" can refer to an organization, individual, or other entity that operates an intelligent streetlight network. In some aspects, the operator is a government entity, such as a town, a street department, regional department of transportation, or other suitable office. Additionally or alternatively, the operator may be another entity, such as a university, a company, or an individual. In some aspects, the operator may operate the streetlight network on behalf of another entity, such as a company that operates light networks on behalf of municipalities.

As used herein, the term "intelligent streetlight network" can refer to a group of streetlights that are capable of communicating, such as by transmitting or receiving data. An intelligent streetlight communicates, for example, with other streetlights in the group, with a NOC or other control center, or with another intelligent streetlight network. In some aspects, intelligent streetlights communicate via a local area network, such as a local wireless network. Additionally or alternatively, intelligent streetlights communicate via a mobile communication network. An intelligent streetlight includes, for example, a modem that is capable of connecting to a mobile communication network. In some aspects, an intelligent streetlight having a modem includes additional components capable of enabling communication via a mobile communication network, such as a subscription identification module (e.g., "SIM") card, or other suitable components.

In some aspects, a modem provides capabilities consistent with a fourth-generation mobile telecommunications standard (e.g., a "4G modem"). Additionally or alternatively, a modem provides capabilities consistent with a third-generation mobile telecommunications standard (e.g., a "3G modem"), a modem belonging to a category M1 (e.g., "Cat M1 modem"), a narrowband category (e.g., "Cat NB-IoT modem"), or any other suitable category or standard. In some aspects, 3G modems, Cat M1 modems, or Cat NB-IoT modems provide a lower data rate as compared to a 4G modem. Additionally or alternatively, 3G modems, Cat M1 modems, or Cat NB-IoT modems are less expensive as compared to a 4G modem.

As used herein, the terms "mobile communication network" or "mobile network" can refer to a network that enables communication of mobile devices or wireless devices. Additionally or alternatively, the mobile communication network enables communication of devices using an evolved packet core architecture on a long-term evolution standard ("LTE EPC network"). In some aspects, a mobile network includes one or more network segments. For example, a network segment includes a portion of the mobile network that is isolated from the rest of the mobile network, such as by a firewall, gateway, proxy, or other security component that is capable of restricting traffic to and from the segment. A security component includes, for example, one or more of a hardware component or a virtual component. In some aspects, the network segment is accessed via an access point name (e.g., "APN"). Additionally or alternatively, a device, such as an intelligent streetlight, accesses a network segment via settings stored on the device, such as settings indicating a user account, an APN, a proxy address, or other suitable settings.

In some aspects, intelligent streetlights communicate with a NOC via a mobile communication network. Each intelligent streetlight includes, for example, a modem that is capable of connecting to a mobile network. For example, an intelligent streetlight having a 4G modem communicates with a mobile network providing data services, telephone services, or both.

Referring now to the drawings, FIG. 1 depicts an example of a system for enabling communication between one or more intelligent streetlights, including intelligent streetlights 110a, 110b, through 110n (collectively referred to herein as intelligent streetlights 110) and a NOC 150. In some aspects, communications are transmitted via a mobile communications network 190. The mobile network 190 can include a core mobile network (e.g., an LTE EPC network) having one or more mobile communication nodes, such as a radio access node (e.g., "cell tower"), a wireless access point, or any other suitable type of communications node.

In some aspects, intelligent streetlights 110 include components or operation instructions that enable communications via mobile network 190. Each of intelligent streetlights 110a, 110b, through 110n includes, for example, a modem, an antenna, a SIM card, a microprocessor configured (e.g., with operation instructions) to provide or receive information via the modem (e.g., data transmissions, "text" messages), memory components for settings related to one or more of NOC 150 or mobile network 190, or other suitable components.

Additionally or alternatively, one or more of the intelligent streetlights 110 is associated with one or more sensors, such as sensors 120a, 120b, through 120n (collectively referred to herein as sensors 120). For example, intelligent streetlight 110a is associated with sensor 120a, intelligent streetlight 110b is associated with sensor 120b, and intelligent streetlight 110n is associated with sensor 120n. In some aspects, an intelligent streetlight includes a sensor, such as a global positioning (e.g., "GPS") module that is included within an enclosure of the intelligent streetlight. Additionally or alternatively, a sensor communicates with the respective intelligent streetlight, such as by a wired connection, a bus (e.g., within the intelligent streetlight), a wireless communication technique, or any other suitable communication technique. Additionally or alternatively, a particular sensor, such as sensor 120a, is capable of communicating with multiple intelligent streetlights, such as streetlights 120a and 120b.

Sensors include, for example, daylight sensors, motion sensors, cameras, sound sensors (e.g., gunshot detection), chemical sensors (e.g., pollution or biochemical detection), system sensors (e.g., maintenance, copper theft detection), weather sensors, or any other suitable sensor type. In some aspects, a sensor provides information to one or more associated intelligent streetlights. The associated intelligent streetlight, for example, modifies its operation based on the provided information. For example, if intelligent streetlight 110a receives information from a daylight sensor 120a, the intelligent streetlight 110a may modify its operation based on information describing an amount of ambient light (e.g., turns on when ambient light is low). Additionally or alternatively, intelligent streetlights transmit information provided by an associated sensor to a NOC or to another intelligent streetlight. For example, responsive to receiving information from a gunshot detection sensor 120b, intelligent streetlight 110b provides information to NOC 150 via mobile network 190. The provided information may indicate a possible emergency at the location of intelligent streetlight 110b. In addition, intelligent streetlight 110b provides additional information to intelligent streetlights 110a-n via a mobile network 190. Responsive to receiving the additional information from intelligent streetlight 110b, intelligent streetlights 110a-n modify their respective operations by, for example, increasing light output or communicating with additional sensors (e.g., providing instructions to a camera 120n).

In some aspects, NOC 150 communicates with one or more of intelligent streetlights 110. For example, NOC 150 provides instructions for operation of intelligent streetlights 110. These instructions can indicate, for example, a level of light output or a schedule of operation (e.g., lights turning on at a certain time of day). Additionally or alternatively, NOC 150 receives information from one or more intelligent streetlights 110, such as information indicating an operation of the intelligent streetlight (e.g., lights turning on), a failure (e.g., power outage, maintenance problem), or information provided by an associated sensor. In some aspects, NOC 150 modifies its operation responsive to receiving information from intelligent streetlights 110. For example, responsive to receiving information indicating a power failure, NOC 150 provides an indication of the power failure, such as an indication displayed on a user interface or a communication provided to another computer system.

In some aspects, the NOC 150 provides, to intelligent streetlights, information related to a mobile communications network. For example, NOC 150 provides provisioning information related to mobile network 190. Provisioning information includes, for example, instructions to activate, modify, or deactivate a subscription (e.g., a subscription plan on mobile network 190). Modifications to a subscription include, for example, changing an amount or speed of data included in a subscription, or activating or deactivating services included in a subscription (e.g., deactivating voice service, activating text messages), or other suitable activities. In some cases, the provisioning information includes a mobile network configuration having a bandwidth.

Additionally or alternatively, NOC 150 provides, to intelligent streetlights 110, settings information related to mobile network 190. Settings information includes, for example, an IP address assigned to the intelligent streetlight, an APN indicating a segment of the mobile communication network, an indication of a keep-alive timer, or other suitable information.

In some aspects, operation of an intelligent streetlight is based on provisioning or settings information. For example, intelligent streetlight 110a may have a location on a busy street with many businesses. NOC 150 provides, to intelligent streetlight 110a, settings information including a first APN (e.g., business.cityoperations.net) for a first segment of mobile communications network 190. Based in part on receiving the first APN as a setting, intelligent streetlight 110a performs operations related to the first segment, such as providing light output appropriate for a busy city district or providing sensor information to additional intelligent streetlights having the first APN. Additionally or alternatively, intelligent streetlight 110n has a location in a residential neighborhood. NOC 150 provides, to intelligent streetlight 110n, settings information including a second APN (e.g., residential.cityoperations.net) for a second segment of mobile network 190. Based in part on receiving the second APN as a setting, intelligent streetlight 110n performs operations related to the second segment, such as providing light output appropriate for a residential district or providing sensor information to additional intelligent streetlights having the second APN.

In some aspects, the operation instructions are provided to one or more intelligent streetlights based in part on provisioning or settings information of the intelligent streetlights. For example, NOC 150 provides operation instructions (e.g., a level of light output, a schedule of operation) to intelligent streetlights included in the first segment of the mobile network. Additionally or alternatively, NOC 150 provides different operation instructions to intelligent streetlights included in the second segment. Based in part on their respective settings, intelligent streetlights 110a and 110n each receive the respective operation instructions provided by NOC 150.

In some aspects, communications transmitted via a mobile communication network occur with an improved speed as compared to communications transmitted via a local wireless network. For example, communications transmitted via mobile network 190 between NOC 150 and intelligent streetlights 110 may occur with a latency of about 100-500 milliseconds (e.g., about the latency of placing a mobile telephone call). Communications transmitted via a local wireless network, such as a local wireless network using a mesh configuration, may occur with a latency that depends on the number of network components (e.g., a number of network routers, gateways) that relay the communication between a streetlight and a NOC. For instance, communications transmitted via a local wireless network may occur with a latency between about ten seconds and five minutes. In some aspects, time-sensitive communications from an intelligent streetlight (e.g., a potential emergency, a loss of power) transmitted via a mobile communication network are received more quickly as compared to transmission via a local wireless network.

Figure 2:
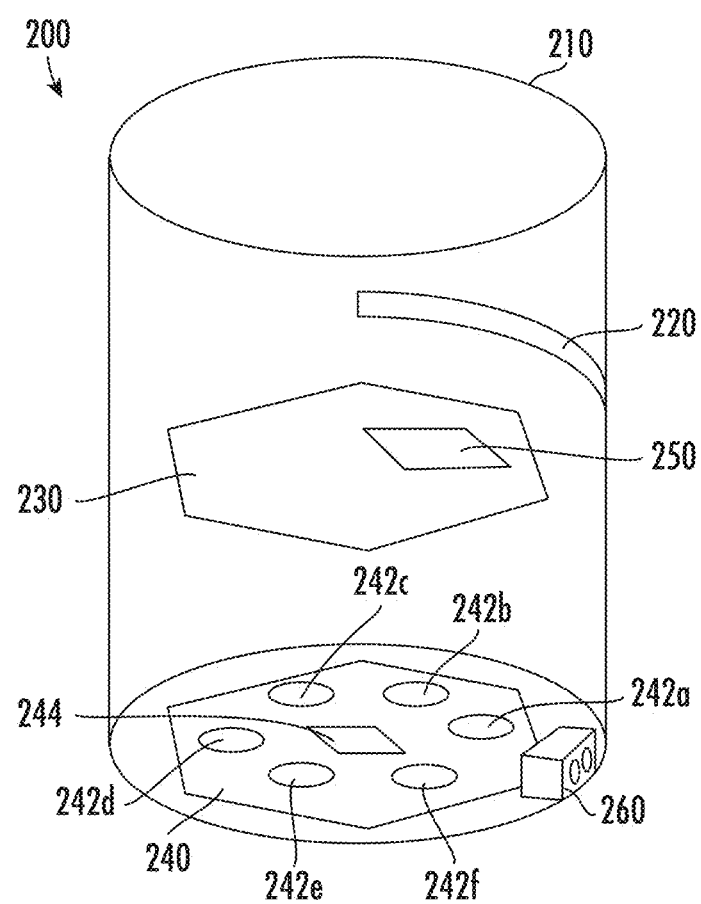
FIG. 2 depicts an example of an intelligent streetlight, according to certain aspects.

In some aspects, an intelligent streetlight is implemented as an enclosure having one or more components. For example, an enclosure includes one or more lighting components, a microprocessor, a modem, an antenna, or other suitable components. FIG. 2 depicts an example of an intelligent streetlight 200 that includes an enclosure 210. The enclosure 210 can be installed, for example, at a streetlight pole, on a mounting framework attached to a building, or at any other suitable location. In FIG. 2, the enclosure 210 is depicted as a cylinder, but any suitable structure may be used. In some aspects, enclosure 210 is installed with other streetlights (e.g., including intelligent or non-intelligent lights), such as within a multi-light housing.

Enclosure 210 includes additional components, such as lighting control module 240, communications module 230, modem 250, and antenna 220. In some aspects, the components are arranged within enclosure 210 such that lighting control module 240 is located at an end of enclosure 210, communications module 230 is located at a first distance away from lighting control module 240, and antenna 220 is located at a second distance away from lighting control module 240. In some cases, the second distance is greater than the first distance, such that the antenna 220 is farther from the lighting control module 240 than the communications module 230 is. For example (and without limitation), lighting control module 240 is located at the enclosure base, communications module 230 is near the middle of the enclosure, and the antenna 220 is located above the communications module 230 (e.g., closer to the top of the enclosure). In some aspects, the first distance between lighting control module 240 and communications module 230 is equal to or greater than a first threshold distance, such as a minimum distance to prevent interference between lighting control components and communication components. Additionally or alternatively, the second distance between lighting control module 240 and antenna 220 is equal to or greater than a second threshold distance, such as another minimum distance to prevent interference between lighting control components and signals received or transmitted by the antenna. Components included in the intelligent streetlight 200, including components located outside of enclosure 210 (e.g., an external light bulb) communicate, for example, via wires, busses, wireless communication, or other suitable communication techniques.

In some aspects, lighting control module 240 includes components related to producing and/or controlling light output. For example, lighting control module 240 includes lighting components, such as lighting components 242a through 242f (collectively referred to herein as lighting components 242). The lighting components 242 include one or more devices, such as devices capable of producing light (e.g., light-emitting diodes), or devices capable of connecting to light-producing devices (e.g., a wiring harness connecting to a bulb located outside of enclosure 210). Additionally or alternatively, lighting control module 240 includes a control device, such as microprocessor 244, that is capable of determining a level of light output and providing instructions to the lighting components. For example, microprocessor 244 determines a level of light output, such as based on stored information or on information received via modem 250. Additionally or alternatively, microprocessor 244 produces instructions indicating the light output level, and provides the instructions to lighting component 242. In some aspects, lighting control module 240 includes additional components, such as memory or calculation devices associated with microprocessor 244, devices to modify light output (e.g., ballast, energy efficiency device), timer or clock devices (e.g., to implement a schedule), or other suitable components. For example, intelligent streetlight 200 includes an interface 260 by which sensors or other devices may be connected. In FIG. 2, the interface 260 is depicted as being located at the base of enclosure 210, but other implementations are possible.

In some aspects, communications module 230 includes components related to transmitting and receiving information, such as via modem 250 or antenna 220. For example, intelligent streetlight 200 receives a communication. The communication is received, for example, from a NOC or another intelligent streetlight, and includes information, such as operation instructions. In some aspects, the communication is received by antenna 220 and provided to modem 250. Modem 250 interprets the received communication, such as by demodulating a signal that is received by antenna 220. Additionally or alternatively, modem 250 extracts information included in the communication, and provides the extracted information to one or more other components of intelligent streetlight 200. For example, modem 250 provides extracted information to microprocessor 244, or to another processor included in intelligent streetlight 200. The processor determines, for example, that the extracted information is instructions related to light output, provisioning information, settings information (e.g., an IP address, an APN), information from another intelligent streetlight (e.g., power outage data, malfunction data, sensor data), or other types of information. In some cases, the extracted information is intended for the intelligent streetlight 200, intended to be provided by the intelligent streetlight 200 to another device (e.g., a sensor, another intelligent streetlight), or a combination of these.

Additionally or alternatively, intelligent streetlight 200 transmits a communication, such as via modem 250 or antenna 220. For example, a processor, such as microprocessor 244 or another processor, determines that information will be provided in a transmission to a NOC or another intelligent streetlight. Modem 250 produces an outgoing communication, such as by modulating a signal that is capable of transmission by antenna 220. Antenna 220 receives the modulated signal from modem 250, and transmits a communication based on the modulated signal. The transmitted communication includes, for example, data describing a power outage or malfunction, data from a sensor associated with intelligent streetlight 200, or other types of information. In some aspects, the provided information includes information received in a previous communication. For example, operation instructions previously received from a NOC are provided in a transmission to another intelligent streetlight.

In some aspects, antenna 220 includes a flexible circuit board (e.g., a flex circuit) that is affixed to a surface. For example, the flex circuit is affixed to an interior surface of enclosure 210. Additionally or alternatively, antenna 220 is capable of receiving or transmitting communications via a wireless medium, such as radio signals exchanged with a radio tower of a mobile communications network (e.g., cell tower).

In some aspects, the modem 250 communicates with a NOC via a mobile communication network. Communications between the modem 250 and the NOC are transmitted, for example, via a connection using one or more networks (including, without limitation, a mobile network). In some aspects, a connection is established using a transmission control protocol (e.g., "TCP"), such as between an IP address associated with the intelligent streetlight 200 and an IP address associated with the NOC. Establishing a connection includes, for example, exchanging data packets, such as a data packet including identification of the NOC and a data packet including identification of the intelligent streetlight 200. In some aspects, the data exchanged for the purpose of establishing a connection has a first quantity (e.g., a few hundred bytes).

In some aspects, a connection between the intelligent streetlight 200 and the NOC is maintained, such that the connection is not lost after a period of time (e.g., dropped, timed out). Additionally or alternatively, the intelligent streetlight 200 implements a TCP keep-alive protocol. For example, the intelligent streetlight 200 sends small amounts of data, or keep-alive packets, to the NOC at intervals. A keep-alive packet indicates that the connection is to remain open. In some aspects, the keep-alive packet has a second quantity of data (e.g., about 60 bytes) that is smaller than the first quantity of data exchanged to establish a connection.

Use of a keep-alive protocol enables, for example, the intelligent streetlight 200 to maintain a connection to a NOC without using up large amounts of data. For example, if the intelligent streetlight 200 is provisioned with a relatively small data plan, the intelligent streetlight 200 may use a keep-alive protocol to maintain a connection without expending a high percentage of the data plan's capacity on establishing and re-establishing connections to the NOC.

In some implementations, a connection is established using one or more IP addresses associated with the intelligent streetlight 200 or the NOC. The IP addresses are included, for example, in a public network or a private network in which the NOC and the intelligent streetlight 200 are members. In some cases, the NOC has a public IP address, by which one or more intelligent streetlights may establish a connection to the NOC. Additionally or alternatively, the intelligent streetlight 200 may have a private IP address. For example, an intelligent streetlight 200 may establish a connection to the NOC via the public IP address of the NOC. The NOC may transmit information to the intelligent streetlight 200 via the private IP address of the intelligent streetlight 200. In some cases, the NOC may transmit an additional private IP address to the intelligent streetlight 200, such that the NOC and intelligent streetlight 200 may establish an additional connection using private IP addresses for both the NOC and the intelligent streetlight 200.

Figure 3:
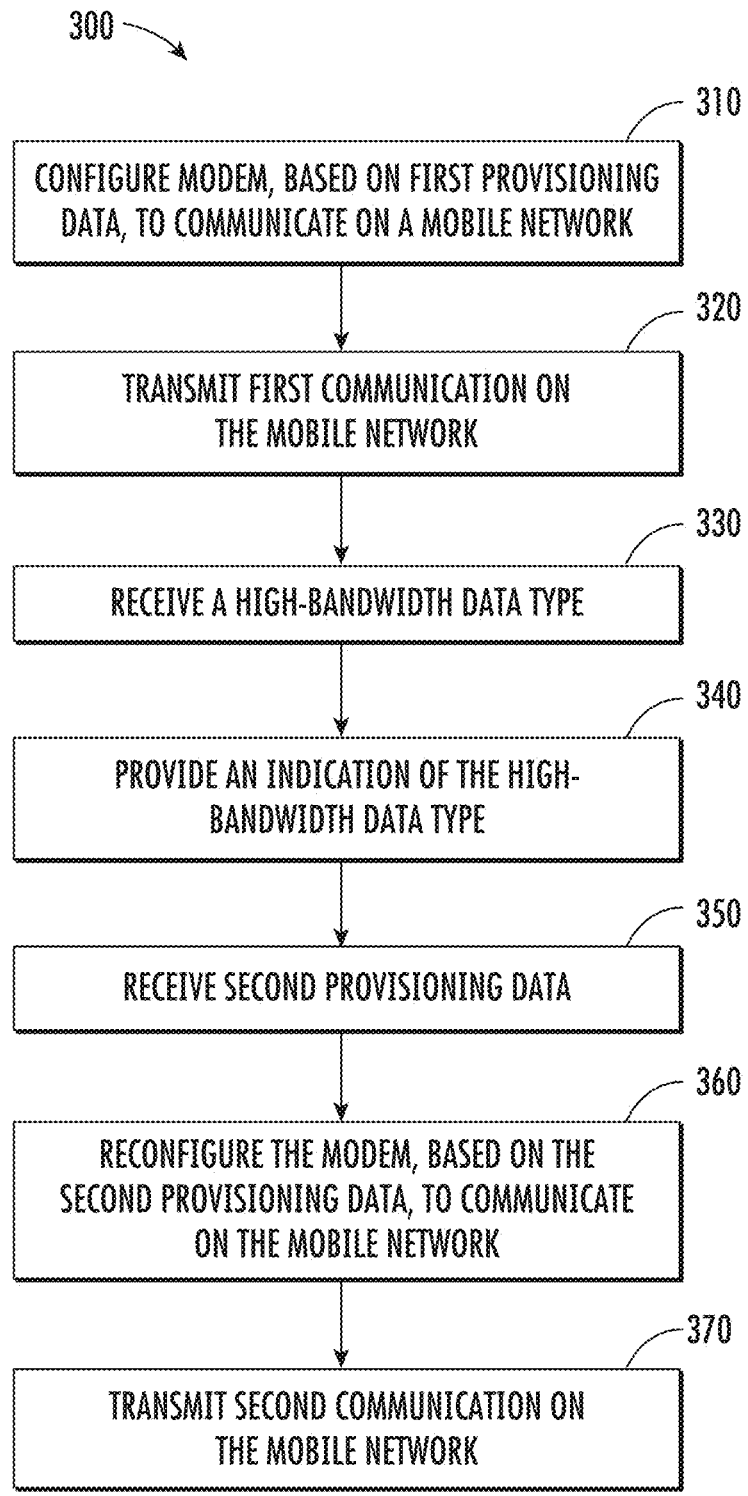
FIG. 3 is a flow chart depicting an example of a process for configuring an intelligent streetlight to communicate on a mobile communication network, according to certain aspects.

FIG. 3 is a flow chart depicting an example of a process 300 for configuring an intelligent streetlight to communicate on a mobile communication network. In some implementations, such as described in regards to FIGS. 1 and 2, a processor included in an intelligent streetlight implements operations described in FIG. 3, by executing suitable program code. For illustrative purposes, the process 300 is described with reference to the examples depicted in FIGS. 1 and 2. Other implementations, however, are possible.

At block 310, the process 300 involves configuring a modem, such as a modem in an intelligent streetlight, to communicate on a mobile communications network. In some cases, the modem is configured based on first provisioning data for the mobile network. For example, the modem 250 may be configured to communicate on a mobile network by the microprocessor 244. In some cases, the first provisioning data is received from a NOC, such as a NOC 150. Additionally or alternatively, the first provisioning data is stored on the intelligent streetlight, such as in a memory component in the intelligent streetlight 200. The memory component may be in communication with one or both of the modem 250 or the microprocessor 244. In some cases, the first provisioning data includes information indicating a particular configuration for communicating on the mobile network, such as a low-bandwidth mobile network configuration.

At block 320, the process 300 involves transmitting a communication on the mobile network via the configured modem. For example, the intelligent streetlight 200 transmits a first communication via the configured modem 250. In some implementations, the communication transmitted by the intelligent streetlight may include one or more of sensor data or an indication that sensor data is available for transmission. For example, the communication may include data received from a sensor that is included in (or associated with) the intelligent streetlight. The sensor data included in the communication may be low-bandwidth data. Additionally or alternatively, the communication may include an indication of available data. For example, an intelligent streetlight that has a low-bandwidth mobile network configuration may provide an indication that high-bandwidth data is available for transmission. In addition, the intelligent streetlight may provide a request for additional provisioning data, such as a request for provisioning data indicating a high-bandwidth mobile network configuration.

In some cases, the communication transmitted by the intelligent streetlight may include data related to a communication channel between the intelligent streetlight and a NOC. For example, the communication may include a keep-alive indication. The keep-alive indication may describe a communication session that is established between the intelligent streetlight and the NOC. Additionally or alternatively, the keep-alive indication may include information indicating that a communication session that is already established should be maintained. For example, the keep-alive indication may indicate that the established communication session between the intelligent streetlight and the NOC should be maintained, and not discontinued or timed out.

At block 330, the process 300 involves receiving sensor data having a high-bandwidth data type. The high-bandwidth data type may include an amount of data that is too large to be transmitted reliably via a low-bandwidth mobile network configuration (e.g., transmission may be slow, transmitted data may be incomplete). For example, the intelligent streetlight 110$n$ may receive from the sensor 120$n$ camera data. The camera data may include a relatively large quantity of data (e.g., between 0.2-1.0 megabytes per second of camera footage) that cannot be transmitted via a low-bandwidth configuration in an amount of time that is short enough for the NOC to respond to the camera data.

At block 340, the process 300 involves providing an indication of the high-bandwidth data type. The indication may be provided from the intelligent streetlight to the NOC, via the modem configured with the first provisioning data. For example, the intelligent streetlight having a low-bandwidth configuration may provide an indication that high-bandwidth data is available for transmission. In addition, the indication may include a request, to the NOC, for additional provisioning data, such as a request for provisioning data indicating a high-bandwidth mobile network configuration.

In some implementations, one or more operations related to blocks 330 or 340 are omitted. For example, a NOC may provide additional provisioning data to an intelligent streetlight that has not provided indication of available data.

At block 350, the process 300 involves receiving second provisioning data, such as in a transmission received from the NOC. In some cases, the second provisioning data includes information indicating an additional configuration for communicating on the mobile network, such as a high-bandwidth mobile network configuration. In some implementations, the NOC transmits the second provisioning data in response to an indication that data is available for transmission, such as a high-bandwidth data type.

At block 360, the process 300 involves reconfiguring the modem to communicate on the mobile communications network, based on the second provisioning data. In some cases, the second provisioning data includes information indicating an additional configuration for communicating on the mobile network, such as a high-bandwidth mobile network configuration.

At block 370, the process 300 involves transmitting an additional communication on the mobile network via the reconfigured modem. For example, the intelligent streetlight 200 transmits a second communication via the reconfigured modem 250. In some implementations, the additional communication transmitted by the intelligent streetlight may include additional sensor data. For example, the additional communication may include high-bandwidth data, such as data received from a camera.

Figure 4:
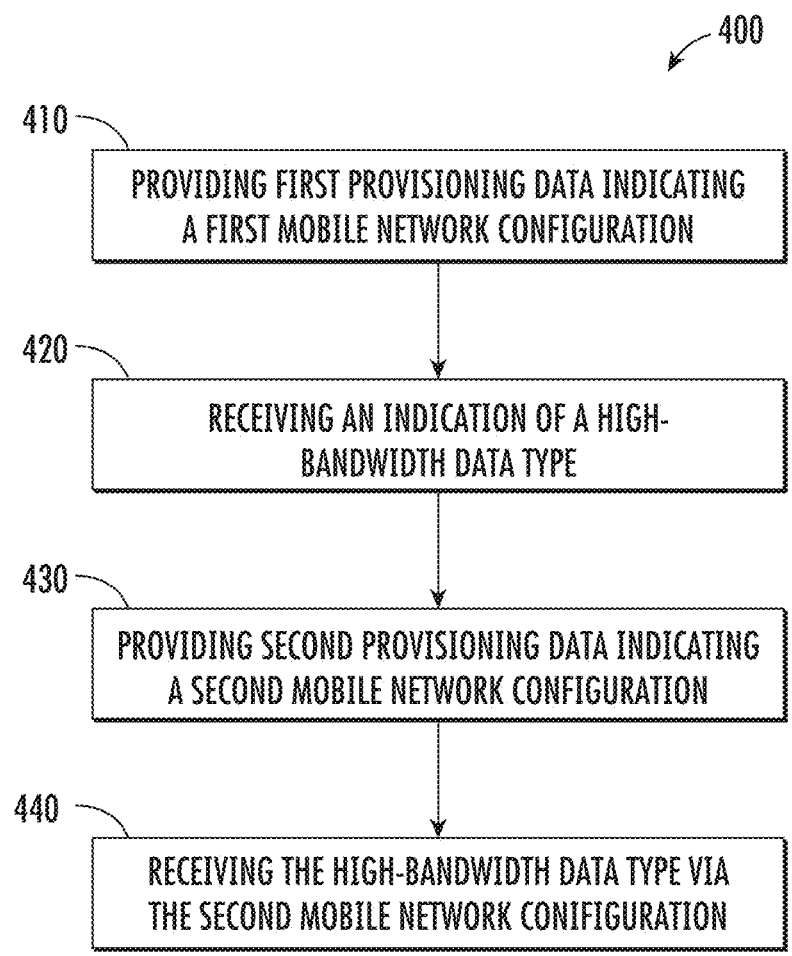
FIG. 4 is a flow chart depicting an example of a process for providing provisioning data to an intelligent streetlight to communicate on a mobile communication network, according to certain aspects.

FIG. 4 is a flow chart depicting an example of a process 400 for providing provisioning data to an intelligent streetlight to communicate on a mobile communication network. In some implementations, such as described in regards to FIGS. 1-3, a computing system (or systems) including a NOC implements operations described in FIG. 4, by executing suitable program code. For illustrative purposes, the process 400 is described with reference to the examples depicted in FIGS. 1-3. Other implementations, however, are possible.

At block 410, the process 400 involves providing first provisioning data that indicates a configuration for communicating on a mobile communications network. The first provisioning data may indicate a low-bandwidth mobile network configuration. For example, a NOC, such as the NOC 150, may provide first provisioning data to an intelligent streetlight, such as the intelligent streetlight 120a.

At block 420, the process 400 involves receiving an indication that a high-bandwidth data type is available. In some cases, the indication is received via the low-bandwidth mobile network configuration. For example, the NOC 150 may receive from the intelligent streetlight 120a an indication that data having a high-bandwidth data type is available for transmission. In some cases, the indication includes a request for additional provisioning data.

At block 430, the process 400 involves providing second provisioning data that indicates an additional configuration for communicating on mobile communications network. The second provisioning data may indicate a high-bandwidth mobile network configuration. In some cases, the second provisioning data is provided responsive to the indication. For example, the NOC 150 may transmit, to the intelligent streetlight 120a, second provisioning data responsive to receiving the indication that the high-bandwidth data type is available. In some cases, the second provisioning data includes additional information. For example, the second provisioning data may include (or be transmitted with) an IP address for the NOC.

At block 440, the process 400 involves receiving a transmission that includes the indicated high-bandwidth data type. The transmission may be received, by the NOC, from the intelligent streetlight and via the high-bandwidth mobile network configuration. For example, the NOC 150 may receive from the intelligent streetlight 120a a transmission including the indicated high-bandwidth data. In some implementations, the transmission is based on additional information included with the second provisioning data. For example, a high-bandwidth transmission (e.g., a transmission received via a high-bandwidth mobile network configuration) may be received by the NOC via the IP address with the second provisioning data.

In some implementations, the NOC may provide provisioning data (or other information) to one or more additional streetlights. For example, responsive to receiving an indication of a high-bandwidth data type, as described in relation to block 420, the NOC may provide, to one or more additional intelligent streetlights, additional provisioning data. The additional provisioning data may indicate the high-bandwidth mobile network configuration.

Additionally or alternatively, the NOC may provide operation instructions to one or more of the intelligent streetlights. In some cases, the operation instructions are based on a configuration of the intelligent streetlights. For example, the NOC may provide a first APN to a first intelligent streetlight, where the first APN is included with provisioning data and describes a first network segment. In addition, the NOC may provide a second APN to a second intelligent streetlight, where the second APN is included with additional provisioning data and describes a second network segment. The NOC may provide operation instructions to each of the intelligent streetlights based on the respective APNs (or other configuration information). For example, the NOC may provide to the first intelligent streetlight first operation instructions based on the first APN, and second operation instructions to the second intelligent streetlight based on the second APN. The operation instructions may include data indicating a level of light output, a schedule of light output, instructions related to communication between the NOC and the intelligent streetlights (e.g., a time period between keep-alive transmissions), or other instructions describing activities of the intelligent streetlights.

In some implementations, the NOC provides provisioning data to multiple intelligent streetlights at once, or within a relatively short period of time. For example, the provisioning data is provided in a transmission having a latency of about 100-500 milliseconds. In some cases, the provisioning data is provided to each of the multiple intelligent streetlights in a respective transmission. Each of the transmissions may be provided in parallel to the multiple intelligent streetlights via the mobile network, such that each of the multiple intelligent streetlights receives its respective transmission within the relatively short period of time (e.g., about 100-500 milliseconds).

In some cases, the provisioning is provided to multiple intelligent streetlights in response to receiving an indication from at least one of the intelligent streetlights. For example, responsive to receiving an indication from the intelligent streetlight 110a, as described in regards to FIG. 1, the NOC 150 provides provisioning data for a high-bandwidth mobile network configuration to at least one of the additional intelligent streetlights 110b through 110n. In some cases, the transmissions include additional data. As a non-limiting example, in response to receiving a transmission from intelligent streetlight 110b indicating data from the gunshot sensor 120b, the NOC 150 provides transmissions to multiple intelligent streetlights in a surrounding geographical area. The transmissions may each include, for example, provisioning data for a high-bandwidth configuration and a request for camera data from each of the multiple intelligent streetlights (or associated sensors). In some cases, the NOC 150 may receive the requested data in less than two seconds (e.g., 100-500 ms to provide the transmission to a light, 100-500 ms to reprovision the light, and 100-500 ms to begin receiving data from the light).

Figure 5:
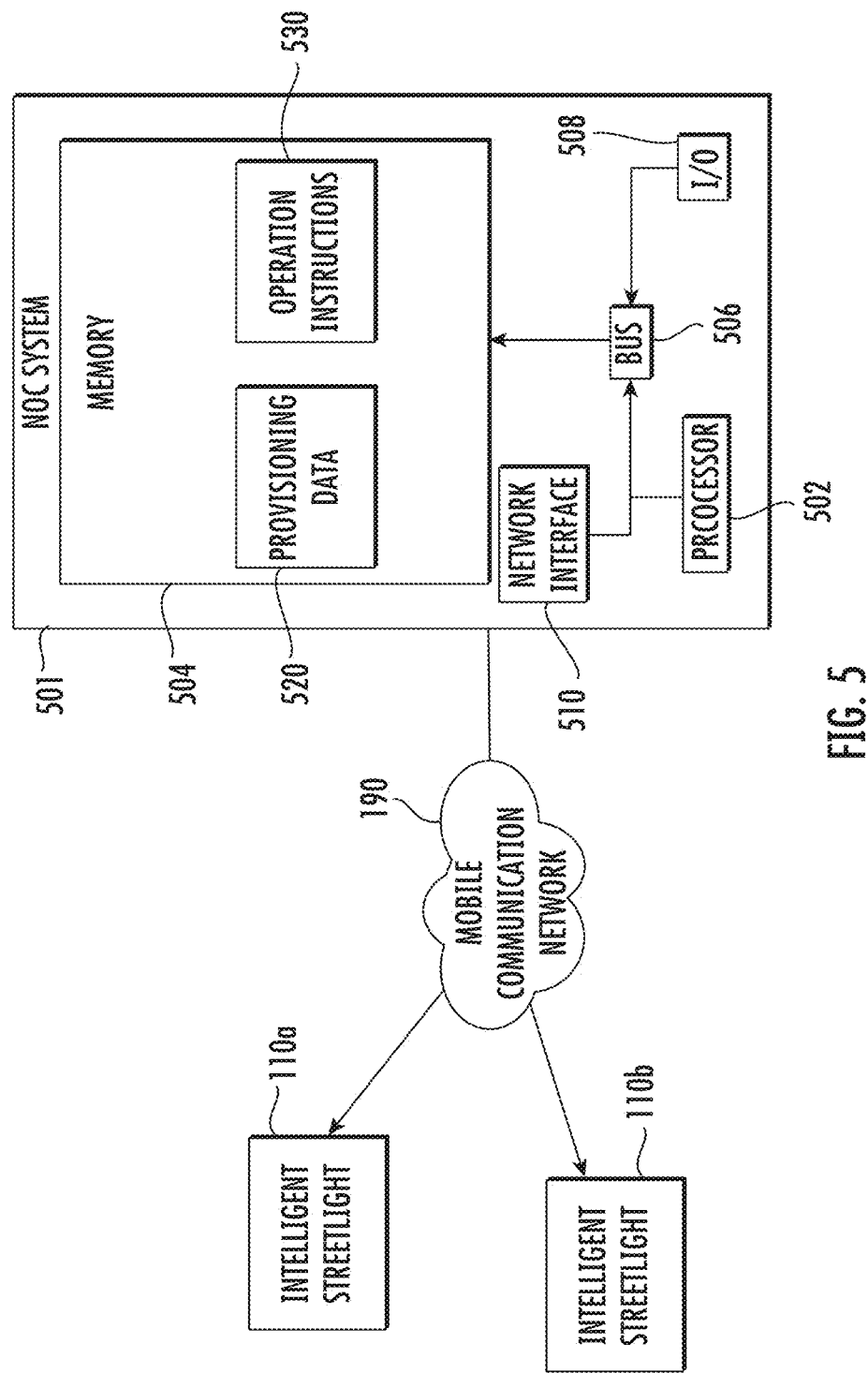
FIG. 5 depicts an example of a computing system capable of implementing a NOC, according to certain aspects.

Any suitable computing system or group of computing systems can be used for performing the operations described herein. For example, FIG. 5 is a block diagram depicting a computing system capable of implementing a NOC, according to certain implementations.

The depicted example of a NOC system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing instructions or information related to configuring one or more intelligent streetlights, such as provisioning data 520, operation instructions 530, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The NOC system 501 may also include a number of external or internal devices such as input or output devices. For example, the NOC system 501 is shown with an input/output ("I/O") interface 508 that can receive input from input devices or provide output to output devices. A bus 506 can also be included in the NOC system 501. The bus 506 can communicatively couple one or more components of the NOC system 501.

The NOC system 501 executes program code that configures the processor 502 to perform one or more of the operations described above with respect to FIGS. 1-4. The program code includes operations related to, for example, one or more of the provisioning data 520, operation instructions 530, or other suitable applications or memory structures that perform one or more operations described herein. The program code may be resident in the memory device 504 or any suitable computer-readable medium and may be executed by the processor 502 or any other suitable processor. In some implementations, the program code described above, the provisioning data 520, and the operation instructions 530 are stored in the memory device 504, as depicted in FIG. 5. In additional or alternative implementations, one or more of the provisioning data 520, operation instructions 530, and the program code described above are stored in one or more memory devices accessible via a data network, such as a memory device accessible via a cloud service.

The NOC system 501 depicted in FIG. 5 also includes at least one network interface 510. The network interface 510 includes any device or group of devices suitable for establishing a wired or wireless data connection to one or more mobile communication networks 190. Non-limiting examples of the network interface 510 include a 4G modem, another suitable modem, an Ethernet network adapter, a wireless interface, and/or the like. The intelligent streetlights 110 are connected to the NOC system 501 via the mobile network 190, and the intelligent streetlights 110 can perform some of the operations described herein, such as configuring or reconfiguring a modem included in the respective intelligent streetlight. The NOC system 501 is able to communicate with one or more of the intelligent streetlights 110 using the network interface 510.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of configuring an intelligent streetlight to communicate on a mobile communications network, the method comprising:
    configuring a modem, included in the intelligent streetlight, to communicate on the mobile communications network, wherein the modem is configured based on first mobile network provisioning data indicating a low-bandwidth mobile network configuration;
    transmitting, via the configured modem, a communication on the mobile communications network;
    receiving, via the configured modem and from a network operations center ("NOC"), a transmission describing second mobile network provisioning data indicating a high-bandwidth mobile network configuration;
    reconfiguring the modem to communicate on the mobile communications network, wherein the modem is reconfigured based on the second mobile network provisioning data; and transmitting, via the reconfigured modem, an additional communication on the mobile communications network, the transmitting based on the second mobile network provisioning data.

2. The method of claim 1, further comprising:
receiving, by the intelligent streetlight and from a sensor, a high-handwidth data type; and
providing, to the NOC and via the configured modem, an indication that the high-bandwidth data type is available,
wherein the NOC transmits the second mobile network provisioning data responsive to receiving the indication, and
wherein the additional communication includes the high-bandwidth data type and is transmitted to the NOC.

3. The method of claim 1, wherein the first mobile network provisioning data indicates a low-bandwidth mobile network configuration, and
wherein the second mobile network provisioning data indicates a high-bandwidth mobile network configuration.

4. The method of claim 1, wherein the communication includes data received from a sensor, and
wherein the additional communication includes data received from a camera.

5. The method of claim 1, wherein the communication includes a keep-alive indication, and is received by the NOC.

6. The method of claim 1, further comprising:
receiving, by the intelligent streetlight and from a sensor, a low-bandwidth data type, wherein the communication includes the low-bandwidth data type and is transmitted to the NOC.

7. An intelligent streetlight configured to communicate on a mobile communications network, the intelligent streetlight comprising:
a lighting control module;
a modem; and
a microprocessor,
wherein the microprocessor is configured to perform operations comprising:
configuring the modem to communicate on the mobile communications network, wherein the modem is configured based on first mobile network provisioning data indicating a low-bandwidth mobile network configuration;
providing, to the configured modem, a first communication for transmission on the mobile communications network;
receiving, via the configured modem and from a network operations center ("NOC"), second mobile network provisioning data indicating a high-bandwidth mobile network configuration;
reconfiguring the modem to communicate on the mobile communications network, wherein the modem is reconfigured based on the second mobile network provisioning data; and
providing, to the reconfigured modem, a second communication for transmission on the mobile communications network, the reconfigured modem configured to transmit the second communication based on the second mobile network provisioning data.

8. The intelligent streetlight of claim 7, wherein the microprocessor is configured to perform further operations comprising:
receiving, by the intelligent streetlight and from a sensor, a high-bandwidth data type; and
providing, to the NOC and via the configured modem, an indication that the high-bandwidth data type is available,
wherein the NOC transmits the second mobile network provisioning data responsive to receiving the indication, and
wherein the second communication includes the high-bandwidth data type and is transmitted to the NOC.

9. The intelligent streetlight of claim 7, wherein the first mobile network provisioning data indicates a low-bandwidth mobile network configuration, and
wherein the second mobile network provisioning data indicates a high-bandwidth mobile network configuration.

10. The intelligent streetlight of claim 7, wherein the microprocessor is configured to perform further operations comprising:
configuring the lighting control module to provide a first level of light output; and
responsive to receiving the second mobile network provisioning data, reconfiguring the lighting control module to provide a second level of light output.

11. The intelligent streetlight of claim 7, wherein the first communication includes a keep-alive indication, and is received by the NOC.

12. The intelligent streetlight of claim 7, wherein the microprocessor is configured to perform further operations comprising:
receiving, by the intelligent streetlight and from a sensor, a low-bandwidth data type, wherein the first communication includes the low-bandwidth data type and is transmitted to the NOC.

13. A system for configuring an intelligent streetlight for communicating on a mobile communications network, the system comprising:
a network operations center ("NOC"); and
at least one intelligent streetlight, wherein the NOC and the intelligent streetlight are each configured to communicate via a mobile communications network,
wherein the NOC is configured to perform operations comprising:
providing, to the intelligent streetlight, first provisioning data indicating a low-bandwidth mobile network configuration;
receiving, from the intelligent streetlight and via the low-bandwidth mobile network configuration, an indication that a high-bandwidth data type is available for transmission;
providing, to the intelligent streetlight and responsive to the indication, second provisioning data indicating a high-bandwidth mobile network configuration; and
receiving, from the intelligent streetlight and via the high-bandwidth mobile network configuration, a high-bandwidth transmission including the high-bandwidth data type.

14. The system of claim 13, further comprising an additional intelligent streetlight, wherein the operations further comprise:
providing, to the intelligent streetlight and with the first provisioning data, a first access point name indicating a first network segment;
providing, to the additional intelligent streetlight and with additional provisioning data, a second access point name indicating a second network segment;
providing, based on the first access point name, first operation instructions to the intelligent streetlight; and providing, based on the second access point name, second operation instructions to the additional intelligent streetlight.

15. The system of claim 13, further comprising an additional intelligent streetlight, wherein the operations further comprise:
providing, to the additional streetlight and responsive to receiving the indication, additional provisioning data indicating the high-bandwidth mobile network configuration.

16. The system of claim 13, wherein:
the second provisioning data includes an IP address, and
the high-bandwidth transmission is received via the IP address.

* * * * *